(12) United States Patent
Scholz et al.

(10) Patent No.: US 7,306,163 B2
(45) Date of Patent: Dec. 11, 2007

(54) SMART CARD AND METHOD FOR ITS PRODUCTION

(75) Inventors: Andreas Scholz, Hildrizhausen (DE); Stephan Schwarzer, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/203,337

(22) Filed: Aug. 11, 2005

(65) Prior Publication Data

US 2006/0124753 A1 Jun. 15, 2006

(30) Foreign Application Priority Data

Dec. 14, 2004 (EP) .................................. 04106582

(51) Int. Cl.
*G06K 19/06* (2006.01)
(52) U.S. Cl. ...................... 235/492; 235/441; 235/487; 343/702; 343/725; 343/733; 343/895; 343/907
(58) Field of Classification Search ................ 235/492, 235/441, 487; 343/907, 702, 733, 895, 725
See application file for complete search history.

(56) References Cited

U.S. PATENT DOCUMENTS

| | | | |
|---|---|---|---|
| 6,374,486 B1 * | 4/2002 | Brechignac .................. | 235/492 |
| 6,575,374 B1 * | 6/2003 | Boyadjian et al. .......... | 235/492 |
| 2003/0213849 A1 * | 11/2003 | Luu ........................... | 235/492 |
| 2004/0159709 A1 * | 8/2004 | Ohta et al. .................. | 235/492 |
| 2005/0011960 A1 * | 1/2005 | Koike et al. ................. | 235/492 |
| 2005/0040243 A1 * | 2/2005 | Bi et al. ...................... | 235/492 |

* cited by examiner

*Primary Examiner*—Michael G. Lee
*Assistant Examiner*—Allyson N Trail
(74) *Attorney, Agent, or Firm*—George R. McGuire; Bond Schoeneck & King, PLLC

(57) ABSTRACT

A smart card having an extended communication distance includes a card body, at least one chip and at least one antenna attached to the chip, wherein the chip and the antenna are embedded in the card body. The smart card is characterized in that the antenna is provided with at least one metal core.

8 Claims, 2 Drawing Sheets

US 7,306,163 B2

SMART CARD AND METHOD FOR ITS PRODUCTION

CROSS-REFERENCE TO RELATED APPLICATION

The present application claims priority to European Patent Application Number 04106582.2, filed Dec. 14, 2004.

BACKGROUND OF THE INVENTION

1. Field of the Invention

The present invention relates to smart cards, especially to contactless and dual interface smart cards, and to methods for producing and enhancing such smart cards to extend the communication distance where the smart card can be used reliably.

2. Description of the Related Art

Having the same size as a credit card, a smart card is able to store and process information by means of the electronic circuits of a chip embedded into the plastic body of the smart card. This chip also contains the processor, volatile memory, non-volatile memory and I/O support. A smart card therefore is a portable and tamper resistant computer. Unlike magnetic stripe cards, smart cards carry both processing power and information. The physical appearance and properties of a smart card are defined in ISO 7816, part 1.

Usually, a smart card does not contain a power supply, a display or a keyboard but communicates with the outside world through a card acceptance device. Therefor, there are two different communication concepts:

Contact communication using gold contacts on the front of the card that are attached to the chip within the card body. Such "contact cards" have to be inserted correctly, i.e. with a defined orientation, into a mechanical card acceptance device.

Contactless communication using electromagnetic fields and an antenna that is attached to the chip within the card body. Such "contactless cards" have only to be placed in a certain proximity of an appropriate card acceptance device to be able to communicate.

As contactless smart cards are very easy to handle, they are popular in situations requiring fast transactions. Public transport systems and access control for buildings are exemplary applications for contactless smart cards. Besides, the microcircuit of contactless smart cards is fully sealed inside the card. In consequence, there are no contacts to become worn from frequent use which is another reason why contactless smart cards overcome limitations of contact cards.

Despite the advantages of contactless smart cards, these cards have their own drawbacks. As mentioned above, contactless smart cards must be located within a certain proximity to exchange data with the card acceptance device and to collect power from the electromagnetic field emitted by the card acceptance device. As the card may move out of range very quickly, only limited data can be transmitted and the transmitted data may be intercepted without the cardholder realizing it. That is why contactless smart cards only qualify for transactions with relatively short duration.

On contactless smart cards that carry two or more chips using the same antenna (e.g. a Mifare and a Legic chip) or that have two or more antennas (e.g. a JavaCard dual interface chip and a Legic chip), this problem is even worse. Two chips attached to one antenna or two different antennas on one card will one another reduce the communication distance. The power that is available from the electromagnetic field emitted by the card acceptance device will be lower compared to a situation where only one consumer will draw power from this field. This problem applies to data communication, too. Due to interference from the second chip or antenna, the effective data rate will be lower compared to a situation where only one consumer will draw power from the field emitted by the card acceptance device.

OBJECT OF THE INVENTION

Starting from this, the object of the present invention is to provide means for extending the communication distance of a smart card to, thus, allow longer transactions between the smart card and a card acceptance device. This will result in a more convenient experience for the card holder, once, because the smart card will start working earlier when approaching the card acceptance device—the cardholder will perceive this as a shorter transaction time—and, twice, the smart card will work longer when moving away from the card acceptance device—the cardholder will perceive this as a longer communication distance and a more fault tolerant system. In any case, the longer the transaction interval is the more data can be transmitted between the smart card and the card acceptance device.

BRIEF SUMMARY OF THE INVENTION

The foregoing object is achieved by a smart card and methods for producing and enhancing a smart card as laid out in the independent claims. Further advantageous embodiments of the present invention are described in the sub claims and are taught in the following description.

According to the present invention, a smart card comprising a card body, at least one chip and at least one antenna attached to said chip, wherein said chip and said antenna are embedded in said card body, is characterized in that said antenna is provided with at least one metal core.

The idea of the present invention is to use the effect of a core inside of a coil solenoid. Such a core increases the distance in which the smart card can be read and is able to communicate with an appropriate card acceptance device.

Substantial for the present invention is, that the metal core is positioned in the magnetic field of the antenna. This can be achieved, e.g., by positioning the metal core on one of the main surfaces of the card body. In a very advantageous embodiment of the present invention the metal core is embedded in the card body together with the antenna and the chip.

As already mentioned above, the present invention applies to smart cards comprising one chip being attached to one antenna as well as to smart cards comprising two or more chips being attached to one antenna as well as to smart cards comprising two or more chips and two or more antennas, each chip being attached to a different antenna.

Furthermore, a method is provided for producing a smart card according to the present invention. To implement an antenna with a metal core integrated in the card body the invention proposes to assemble a bottom foil, a top foil and at least one middle foil between said bottom foil and said top foil, thus forming a foil stack. At least one of said foils, preferably the middle foil, contains the antenna and/or at least a slice of the metallic core. The chip is disposed between the foils of the stack such that the antenna is attached to said chip. Then, the card body is formed by laminating the foil stack, such that at least the chip and the antenna attached to said chip are embedded in the resulting card body.

Finally, the invention proposes to enhance an already laminated smart card by providing a metal core for the antenna embedded in the card body together with the chip. Therefor, the metal core has to be disposed in the magnetic field of the antenna. In an advantageous way this can be done by forming a recess in one surface of the card body such that the recess is surrounded by the antenna. Then, the metal core is positioned within said recess.

BRIEF DESCRIPTION OF SEVERAL VIEWS OF THE DRAWINGS

The invention itself, however, as well as a preferred mode of use, further objectives, and advantages thereof, will best be understood by reference to the following detailed description of an illustrative embodiment when read in conjunction with the accompanying drawings, wherein.

DETAILED DESCRIPTION OF THE INVENTION

Figure 1:
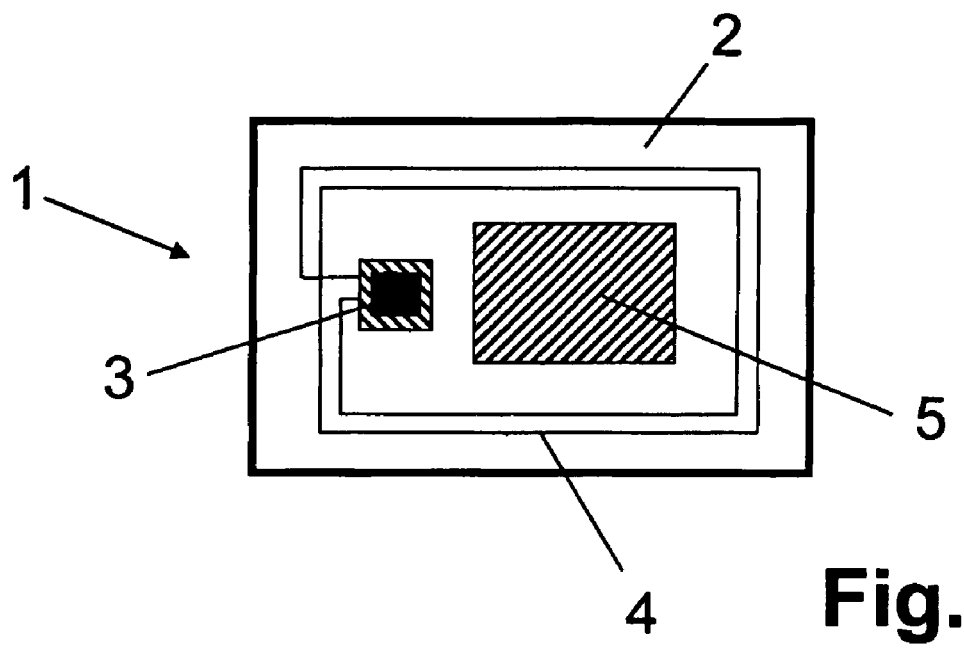
FIG. 1 shows a top view on a smart card according to a first embodiment of the present invention.

The smart card 1, illustrated in FIG. 1, comprises a card body 2. Usually, the card body 2 is formed by joining several foils of plastic material in a lamination process, where the flexible thin foils are baked together to one "hard" plastic card. Embedded in this card body 2 is a chip 3 which is electrically connected to an antenna 4 wound into the card body 2. Depending on the used chip technology it is possible to integrate the chip together with the antenna directly during the lamination process. Another possibility is to implant the chip in a recess formed in the card body after the lamination process.

The antenna 4 is used for communication with a card acceptance device (not shown) as well as for collecting energy from the electromagnetic field emitted by the card acceptance device. According to the invention said antenna 4 is provided with a metal core 5. In the here described embodiment the metal core 5 is integrated in the card body 2 together with the antenna 4 while it is also possible to mount the metal core on one of the main surfaces of the card body. The position of the metal core 5 should be central in reference to the antenna structure 4, the size of the metal core 5 can vary.

Figure 2A:
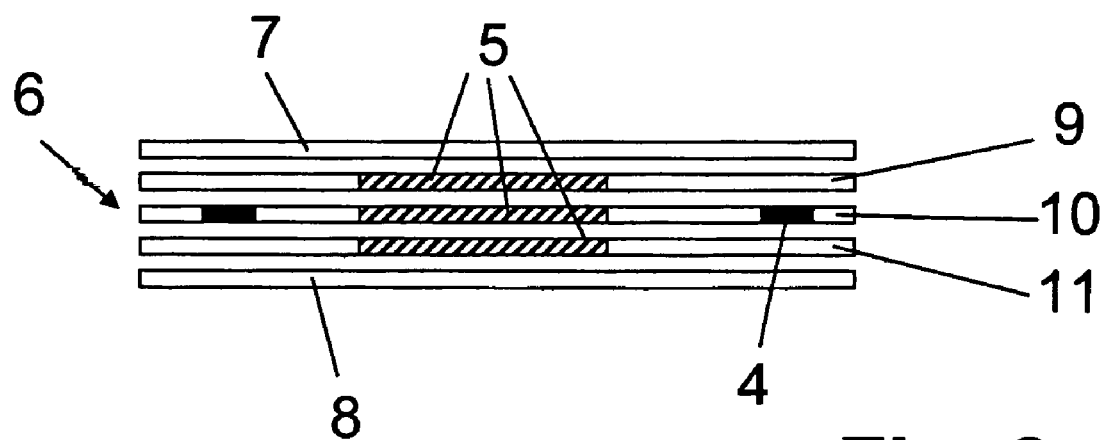
FIG. 2a, 2b show sectional views of a foil stack before and after lamination according to a second embodiment of the present invention.
Figure 2B:
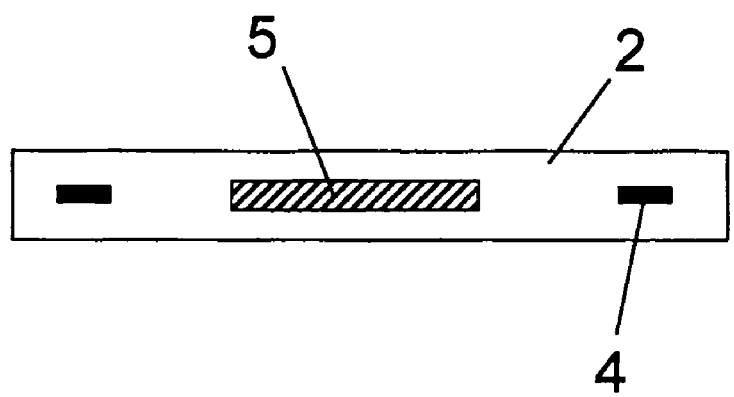

FIGS. 2a and 2b illustrate a method for producing a smart card, as shown in FIG. 1. According to this method the card body is formed of a foil stack 6 comprising a bottom foil 7, a top foil 8 and, in the here described example, three middle foils 9, 10, 11 between said bottom foil 7 and said top foil 8. Foil 10 contains the antenna structure 4 and a slice of the metal core 5 while the foils 9 and 11 only contain further slices of the metal core 5. Although not shown in FIGS. 2a and 2b a chip is disposed in the foil stack 6 between the foils 7 to 11 such that the antenna structure 4 is attached to said chip. The card body 2, shown in FIG. 2b, is formed by laminating the foil stack 6. Thereby, not only the foils 7 to 11 but also the three slices of the metal core 5 are joined, such that beside the chip the antenna structure 4 and the metal core 5 are integrated in the card body 1.

FIGS. 3a, 3b and 4a, 4b illustrate two variants of a method to equip a smart card with a metal core for the antenna attached to the chip of the smart card when the card body 2 has already been formed with the chip and the antenna 4 being embedded in the card body 2.

Figure 3A:
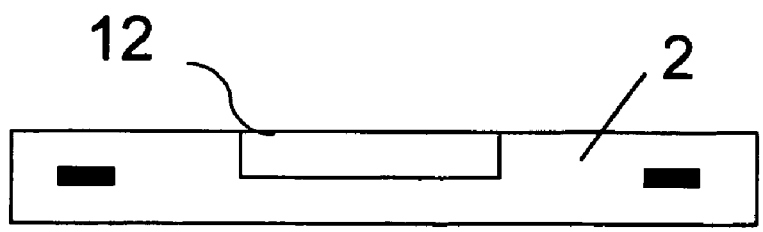
FIG. 3a, 3b show sectional views of a card body after forming a recess in one surface and after inserting a metal core in said recess according to a third embodiment of the present invention.
Figure 3B:
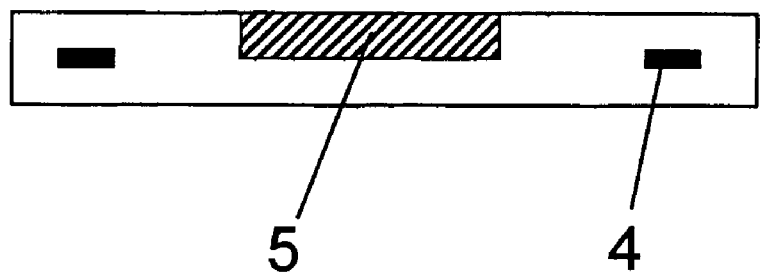
Figure 4A:
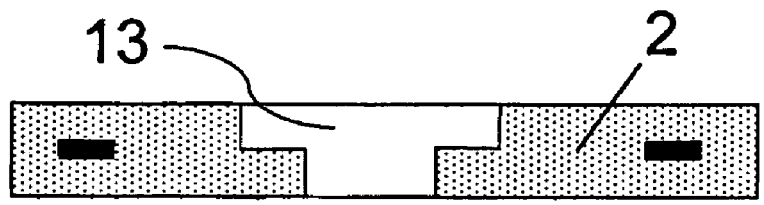
FIG. 4a, 4b show also sectional views of a card body after forming a recess in one surface and after inserting a metal core in said recess according to a fourth embodiment of the present invention.
Figure 4B:
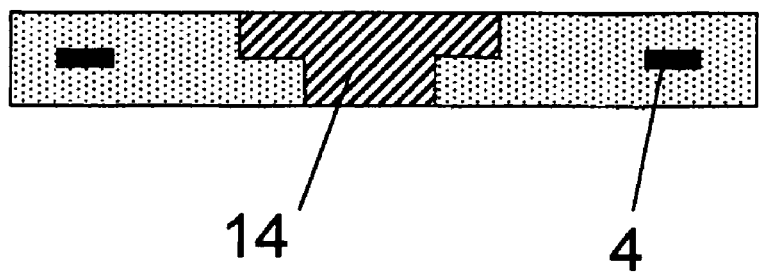

In the example of FIGS. 3a and 3b a recess 12 is formed in one surface of the card body 2 such that the recess 12 is surrounded by the antenna 5. Then, the metal core 5 is inserted within said recess 12, as shown in FIG. 3b. While the depth of recess 12 is approximately half of the thickness of card body 2, recess 13 of the example, shown in FIGS. 4a and 4b, extends over the whole thickness of card body 2. Consequently, the corresponding metal core 14 is as thick as the card body 2. Besides, the form of core 14 is adapted to the form of recess 13, which shows a circumferential shoulder in the inner wall. Metal core 5 as well as metal core 14 may be fixated in the corresponding recess 12, 13, respectively, with an appropriate glue.

What is claimed is:

1. A smart card comprising:
   a card body:
   at least one chip:
   at least one antenna forming at least one planar loop attached to said chip, wherein said chip and said antenna are embedded in said card body; and
   a metal core separate from said antenna and positioned centrally within the at least one loop of the antenna.

2. The smart card according to claim 1, wherein said metal core is also embedded in said card body.

3. The smart card according to claim 1, wherein said card body includes at least one main surface and said metal core is positioned on one of said at least one main surfaces of said card body.

4. The smart card according to claim 1, wherein the smart card comprises at least two chips attached to said at least one antenna.

5. The smart card according to claim 1, wherein the smart card comprises at least two chips and at least two antennas, each chip being attached to a different antenna.

6. A method for producing a smart card comprising the steps of:
   assembling a bottom foil, a top foil, and at least one middle foil between said bottom foil and said top foil wherein one of said foils contains at least one antenna forming at least one planar loop;
   disposing at least one chip between said top and bottom foils such that said antenna is attached to said chip;
   positioning a separate metal core centrally within the at least one loop of the antenna; and
   laminating said top, bottom, and at least one middle foils to form a card body, such that at least said chip and said antenna attached to said chip are embedded in said card body.

7. A method for enhancing a smart card comprising at least one chip and at least one antenna attached to said chip and forming at least one planar loop, said chip and said loop of said antenna being embedded in a card body, said method comprising the step of:
   providing a separate metal core for said antenna such that the metal core is disposed centrally in the loop of the antenna.

8. The method according to claim 7, wherein a recess is produced in one surface of the card body such that the recess is surrounded by said antenna and wherein said metal core is positioned within said recess.

* * * * *